United States Patent [19]

Kawamura et al.

[11] Patent Number: 4,999,784
[45] Date of Patent: Mar. 12, 1991

[54] AXIS CHANGEOVER APPARATUS

[75] Inventors: Hideaki Kawamura, Hachioji; Kentaro Fujibayashi, Musashino, both of Japan

[73] Assignee: Fanuc Ltd., Minamitsuru, Japan

[21] Appl. No.: 315,687

[22] PCT Filed: Aug. 18, 1988

[86] PCT No.: PCT/JP88/00818

§ 371 Date: Feb. 16, 1989

§ 102(e) Date: Feb. 16, 1989

[87] PCT Pub. No.: WO89/01388

PCT Pub. Date: Feb. 23, 1989

[30] Foreign Application Priority Data

Aug. 19, 1987 [JP] Japan .............................. 62-205841

[51] Int. Cl.$^5$ .............................................. G05B 23/02
[52] U.S. Cl. ............................ 364/474.01; 364/474.2
[58] Field of Search .......... 364/474.01, 474.2, 474.21, 364/474.11, 474.06, 133; 118/106, 118; 29/564, 568, 27 R; 82/106

[56]  References Cited

U.S. PATENT DOCUMENTS

| 4,131,836 | 12/1978 | Noda ................................... 318/565 |
| 4,514,814 | 4/1985 | Evans .............................. 364/474.11 |
| 4,684,862 | 8/1987 | Röhrle ............................. 364/474.11 |
| 4,752,885 | 6/1988 | Kawakami et al. ............. 364/474.21 |

Primary Examiner—Jerry Smith
Assistant Examiner—Paul Gordon
Attorney, Agent, or Firm—Staas & Halsey

[57] ABSTRACT

An axis changeover apparatus according to the invention changes axes of movement of a machine tool having axes with the same direction of movement, such as a cross rail axis and quill axis. A check is performed to determine the commanded strokes along axes (Z and W axes) from machining commands supplied by an NC command tape (1). If a move command has a commanded stroke which exceeds a set limit stroke value, the portion of the commanded stroke which exceeds the value is converted into a commanded stroke along the other axis having the same direction of movement, thereby elongating the apparent stroke.

4 Claims, 3 Drawing Sheets

AXIS CHANGEOVER APPARATUS

BACKGROUND OF THE INVENTION

1. FIELD OF THE INVENTION

This invention relates to an axis changeover apparatus which, when a machine tool having a tool such as a cutter possesses a plurality of axes, controls the changeover of these axes.

2. DESCRIPTION OF THE RELATED ART

When a tool is moved and controlled based on command data from an NC command tape in an automatic lathe which performs turning work by means of a tool such as an ordinary cutter, a stroke limit is set with regard to each axis of movement in such a manner that the tool will not collide with a table or a tool rest.

The same is true for large-scale machine tools having a plurality of axes along the same direction of movement. These include multiple-axis machine tools in which the directions of movement of two axes, such as of a cross rail and quill, coincide with the direction of movement of the tool. In a case where machining is carried out by moving the tool a small amount at a specific portion of a workpiece in such a multiple-axis machine tool, the quill axis is used. When a large amount of movement is made, as when changing a machined portion, the cross rail is used.

In such a machine tool, there are many cases where the mechanical arrangement is such that one axis rides on another. Moreover, it is necessary to set an allowable value for the stroke of movement of each axis. Consequently, depending upon the program of the workpiece to be machined, there are instances in which the amount of movement along an axis of the tool in one machining step becomes too large and exceeds the movable stroke set for a specific axis. For example, when a machining step is programmed in which the movable stroke of the quill is exceeded, machining becomes impossible even if commands are issued. However, irrespective of the fact that the cross rail generally has the same direction as the quill, the commands on the NC tape are created by being divided into commands for the quill axis and commands for the cross rail axis. Hence, commands are formed separately for the cross rail and quill.

Accordingly, not only must the programmer create a command tape while being constantly aware of the allowable stroke set for each axis of the machine tool, but he must also form the commands separately for the cross rail and quill. As a result, only a program conforming to the allowable stroke values can be created. Further, this means that a machine tool in which the strokes of the cross rail and quill differ cannot make use of a program, even if it has the same contents, that has already been created for another machine tool.

SUMMARY OF THE INVENTION

The present invention has been devised in order to solve these problems and its object is to provide an axis changeover apparatus in which an axis to be driven is automatically changed over, with respect to a commanded value exceeding an allowable stroke, between axes whose directions of movement coincide.

According to the present invention, there is provided an axis changeover apparatus for changing over axes to be driven when running by program a machine tool having a drive mechanism which drives a plurality of axes movable in the same direction, comprising control means for controlling movement of an axis having a large allowable stroke and an axis on this axis and having a small allowable stroke, these axes having movable directions that are the same as each other, detecting means for detecting that a commanded value to the control means has exceeded an allowable stroke set for a controlled axis, and converting means for converting a portion of the commanded value that has exceeded the allowable stroke into a commanded value along the axis having the large allowable stroke.

Accordingly, the axis changeover apparatus of the present invention is such that when a commanded value regarding the axis having the short movable stroke exceeds the allowable stroke set for this axis in execution of the contents of a machining command tape, a move command corresponding to the amount of excess can be outputted as a command value for the axis having the long stroke. As a result, the apparent movable stroke is elongated. This lightens the burden on the programmer when originating an NC machining command tape and makes it possible to make common use of a machining command tape among a variety of machine types.

DESCRIPTION OF THE PREFERRED EMBODIMENT

An embodiment of the present invention will now be described in detail with reference to the drawings.

Figure 1:
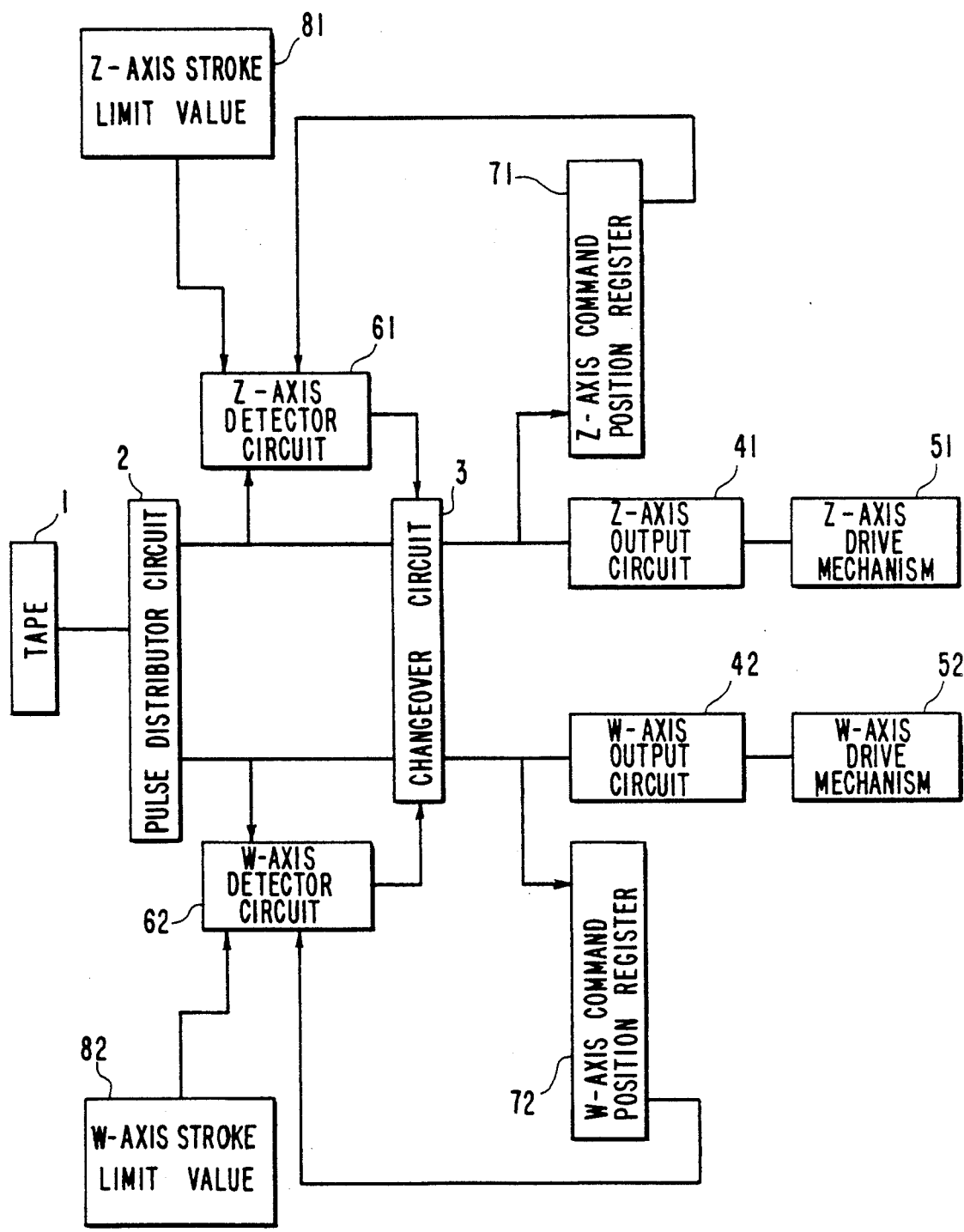
FIG. 1 is a block diagram illustrating an embodiment of the invention.
Figure 2:
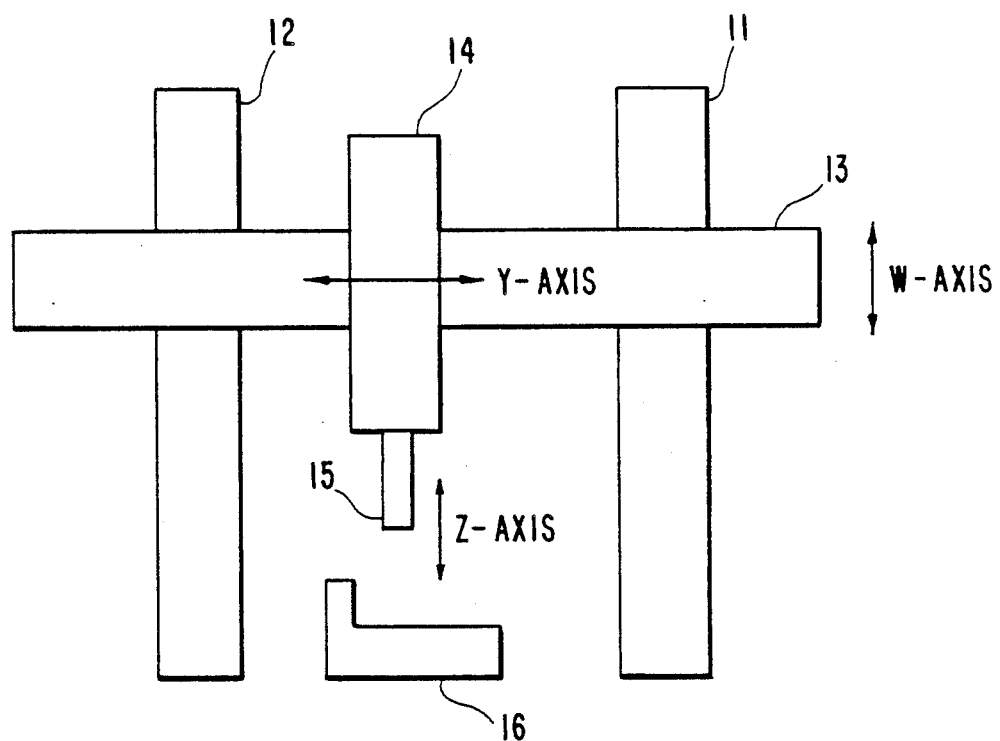
FIG. 2 is an explanatory view illustrating an example of an applicable machine tool.

FIG. 1 is a block diagram illustrating an example of the construction of the axis changeover apparatus of the present invention. By way of example, a plurality of drive mechanisms are controlled by a machining command tape 1 regarding machining performed by a machine tool having the configuration shown in FIG. 2. This machine tool comprises a cross rail 13 supported by posts 11, 12 and having its up-and-down movement controlled by a W-axis drive mechanism, a Y-axis drive mechanism 14 controlled to move transversely on the cross rail 13, and a quill axis (Z axis) 15 movable in the same direction as the W axis at the lower end of the Y-axis drive mechanism 14. The machine tool is such that a prescribed tool executes machining commands with respect to a workpiece 16 by means of the quill axis 15.

Move commands along the respective axes of the machine tool are such that data from a machining command tape 1 read into an NC unit are applied to a pulse distributor circuit 2 to be distributed along each of the W, Y and Z axes. Movement by the cross rail 13 in FIG. 2 corresponds to a large amount of movement when the distance from the tool to the machining surface is set to a predetermined value at high speed in dependence upon the size of the workpiece 16. A controlled variable regarding a comparatively small movement on the actual machining surface is set for the quill axis 15.

The pulse distributor circuit 2 is connected to a Z-axis output circuit 41 and a W-axis output circuit 42 via a changeover circuit 3. These output circuits 41, 42 convert Z-axis distributed pulses $IPL_z$ and W-axis distributed pulses $IPL_w$ supplied thereto into drive commands which drive respective ones of the axis drive mechanisms 51, 52. The pulse distributor circuit 2 is connected to a Z-axis detector circuit 61 and a W-axis detector circuit 62. When required, a move command for the cross rail is formed from a portion of a Z-axis drive command, which serves as a quill command value, in the changeover circuit 3, as will be described later.

A Z-axis command position register 71 stores the present coordinate of the Z-axis drive mechanism 51, and a W-axis command position register 72 stores the present coordinate of the W-axis drive mechanism 52. These registers feed signals regarding position along the respective axes back to the detector circuits 61, 62. Limit values for each axis which are specific to the machine tool are applied to the detector circuits 61, 62 from a Z-axis stroke limit setting circuit 81 and a W-axis stroke limit setting circuit 82. The detector circuit 61 performs monitoring to determine whether the commanded value for the Z axis is within the allowable stroke. When the commanded value for the Z-axis exceeds the set limit value, the changeover circuit 3 converts the Z-axis distributed pulses $IPL_z$, which are to be converted into a commanded value for the W-axis drive mechanism 52, into W-axis distributed pulses $IPL_w$, so that movement of the tool corresponding to the amount of excess is implemented by the W-axis drive mechanism 52.

Thus, even if a move command regarding the workpiece 16 to be machined is formed which exceeds the allowable stroke of the quill, the apparent allowable stroke along the quill axis 15 is elongated, thereby making it possible to execute the machine program with flexibility. In addition, rather than separately forming the commands for the cross rail and quill from the start, it is possible to convert the commanded values automatically when required. In consequence, machine tools of types having different strokes can be controlled by the same command program.

Figure 3:
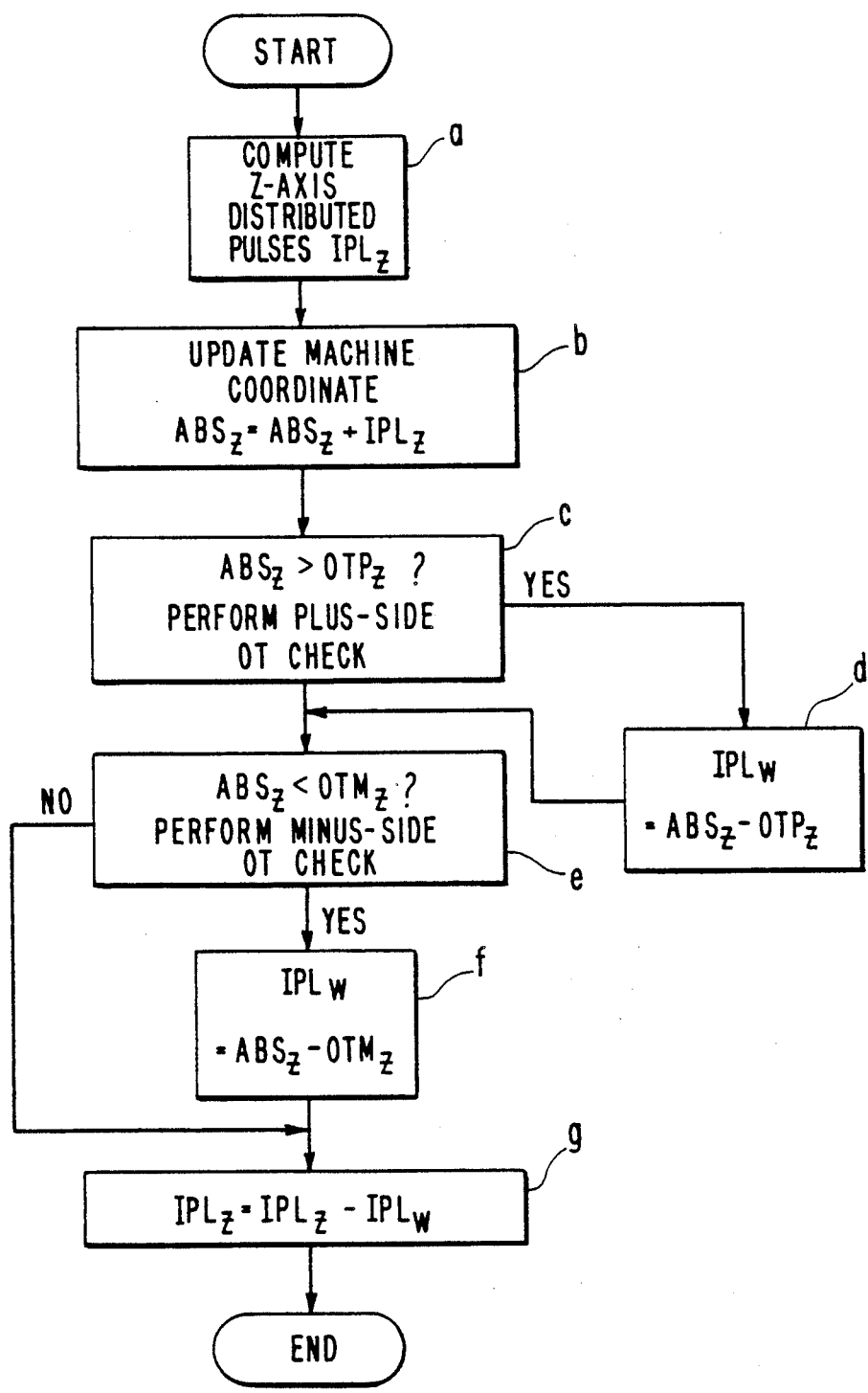
FIG. 3 is a flowchart illustrating the operation of the embodiment.

FIG. 3 illustrates a control flow when command data distributed along the Z axis is converted into command data along the W axis in the apparatus of the above-described embodiment.

A distribution computation for the distributed pulses $IPL_z$ commanded along the Z axis is performed at the execution period of such processing as linear or circular interpolation regarding the position of the tool (step a). When a machine coordinate value $ABS_z$ updated based on the result of the computation is formed (step b), an OT check on the plus side is performed by the Z-axis detector circuit 61 based on a stroke limit signal $OTP_z$ in the plus direction along the Z axis from the limit value (step c). When the machine coordinate value $ABS_z$ along the Z axis is greater than $OTP_z$, distributed pulses $IPL_w$ along the W axis are computed (step d). When the stroke limit value $OTP_z$ is not exceeded, an OT check on the minus side is then performed (step e). When the machine coordinate value $ABS_z$ along the Z axis is smaller than a stroke limit value $OTM_z$ in the minus direction, a computation $IPL_w = ABS_z - OTM_z$ for distributing pulses along the W axis in an amount equivalent to the excess over this value is executed (step f), and Z-axis distributed pulses $IPL_z$ within the allowable stroke are output to the Z-axis output circuit 42 (step g).

As many apparently widely different embodiments of the present invention can be made without departing from the spirit and scope thereof, it is to be understood that the invention is not limited to the specific embodiments thereof except as defined in the appended claims.

The axis changeover apparatus of the present invention is such that an axis to be driven is automatically changed over, with respect to a commanded value exceeding an allowable stroke, between axes whose directions of movement coincide. As a result, there can be provided an axis changeover apparatus having many advantages in control of a machine tool, such as the ability to elongate apparent stroke and reduce the labor involved in preparing a machining command tape.

What is claimed is:

1. An axis changeover apparatus for changing over axes to be program driven on a machine tool having a drive mechanism for driving a plurality of axes in the same direction based on a commanded value, comprising:
   control means for controlling movement of a large stroke axis having a large allowable stroke and a small stroke axis, parallel to the large stroke axis, having a small allowable stroke;
   detection means for determining if the commanded value exceeds the small allowable stroke; and
   conversion means for converting a portion of the commanded value in excess of the small allowable stroke into a changeover command value along the large stroke axis having the large allowable stroke.

2. An axis changeover apparatus according to claim 1, wherein said conversion means comprises:
   pulse distributing means for distributing commanded distributed pulses along a predetermined axis; and
   changeover means for changing over the distributed pulses exceeding the allowable stroke.

3. An axis changeover apparatus according to claim 1, wherein the small stroke axis is a quill rail axis of the machine tool, and the large stroke axis is a cross rail axis of the machine tool.

4. A method for changing over axes used to position a machine tool having a drive mechanism fordriving the machine tool along a large stroke axis and a small stroke axis, parallel to the large stroke axis, said method comprising the steps of:
   (a) distributing a command value to produce movement of the machine tool along the small stroke axis;
   (b) determining if the command value exceeds a small allowable stroke of the small stroke axis;
   (c) producing, based upon said determining of step (b), a changeover command value for the large stroke axis by reducing the command value by the small allowable stroke; and
   (d) producing, based upon said determining of step (b), a modified command value for the small stroke axis by reducing the command value by the changeover command value.

* * * * *